United States Patent Office 3,557,066
Patented Jan. 19, 1971

3,557,066
NOVEL POLYMERS AND PROCESSES
FOR MAKING SAME
Hyman L. Cohen and James R. King, Jr., Rochester,
N.Y., assignors to Eastman Kodak Company, Rochester, N.Y., a corporation of New Jersey
No Drawing. Filed Mar. 1, 1968, Ser. No. 709,893
Int. Cl. C08f 27/08; C08g 20/20
U.S. Cl. 260—78.5
14 Claims

ABSTRACT OF THE DISCLOSURE

Polymers comprising units represented by the formula:

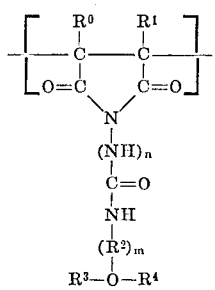

wherein $R^0$ and $R^1$ each represent hydrogen atoms or alkyl groups, and $R^3$ and $R^4$ are each a lower alkyl group or $R^3$ and $R^4$ can together with Q represent the atoms necessary to form a tertiary nitrogen-containing heterocyclic group; $R^2$ represents an alkylene group, $n$ is 0 or 1, $m$ is 0 or 1, and Q represents a nitrogen atom or a carbon radical, with the proviso that $R^3$ and $R^4$ are taken together with Q to represent a tertiary nitrogen-containing heterocyclic group when Q is a carbon radical, and $m$ can be 0 only when Q is a carbon radical. In one aspect polymers containing the units defined above can be made by reacting polymers comprising units of maleic anhydride with a compound represented by the formula:

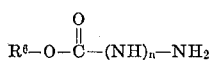

wherein $R^6$ is a hydrocarbon of 1 to 12 carbon atoms and $n$ is an integer of 0 to 1.

This invention relates to novel polymers and processes for preparing polymers. In one aspect this invention relates to novel photographic elements containing said polymers. In another aspect this invention relates to new polymers which can be used to mordant dyes.

It is known that photographic elements intended for various purposes, such as imbibition printing, color printing, etc., can contain various mordanting materials which are intended to prevent migration of coloring materials or dyes, or to absorb dyes from various photographic treating solutions. Many of these mordanting materials are organic in nature and contain long linear chains having basic or acidic groups attached thereto, depending upon the particular coloring materials or dyes which are to be mordanted. However, work in the mordanting art has demonstrated that a material which is a good mordant in one process is often unsatisfactory in other processes. For example, many mordants, although acceptable when used in a process under acid conditions, do not give the desired results in the mordanting of acid dyes in basic media. In view of the increased interest in materials which are mordants for acid dyes, the demand for new and effective mordants of this type is very high.

It is, therefore, an object of this invention to provide new polymeric materials.

It is another object of this invention to provide means for preparing new polymeric materials.

It is another object of this invention to provide polymeric materials which are good dye mordants in basic media.

It is still another object of this invention to provide novel photographic elements.

We have now found that these and other objects of the invention can be accomplished with polymers comprising units of the formula:

Formula (I) 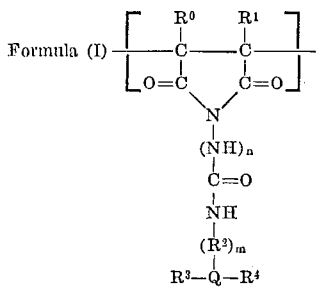

wherein $R^0$ and $R^1$ each represent either hydrogen or a lower alkyl group of 1 to 7 carbon atoms such as methyl, ethyl, propyl, n-butyl, t-butyl and the like, $R^3$ and $R^4$ are each a lower alkyl group, or $R^3$ and $R^4$ can together with Q represent the atoms necessary to form a substituted or unsubstituted tertiary nitrogen-containing heterocyclic group such as 1-piperidine, 4-piperidine, morpholine and the like; $R^2$ represents a straight or branched chain alkylene group of 1 to 6 carbon atoms, and preferably from 2–3 carbon atoms, $n$ and $m$ are each 0 or 1, and Q represents a nitrogen atom or the carbon radical

and when Q is the carbon radical

$R^3$ and $R^4$ are taken together with Q to represent a tertiary nitrogen-containing heterocyclic group, and $m$ can be 0 only when Q is

The novel polymeric compounds of the invention can be prepared by reacting polymers comprising units of maleic anhydride, or closely related derivatives thereof, with certain carbamates or carbazates. The intermediate produced is a novel polymer comprising units having the formula:

Formula (II) 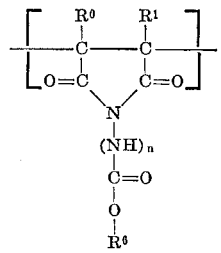

wherein $R^0$, $R^1$ and $n$ are as defined above and $R^6$ is a hydrocarbon of 1 to 12 carbon atoms and preferably 1 to 3 carbon atoms. These polymeric compounds can be reacted with amine compounds to form the novel polymers represented by Formula I above.

Useful interpolymers containing units of maleic anhydride, or substituted derivatives thereof include those polymers represented by the following general formula:

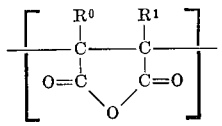

wherein $R^0$ and $R^1$ are as defined above. Interpolymers containing units of maleic anhydride, or derivatives thereof are generally derived from monomers such as polymerizable ethyleneically unsaturated compounds by, for instance, solution polymerization in the presence of free radical catalysts.

Examples of copolymerizable monomers include monoethylenically-unsaturated hydrocarbons such as ethylene, propylene, butene-1, isobutene, 2-methylpentene, di-isobutylene, styrene, α-methylstyrene; monoethylenically-unsaturated esters of aliphatic acids such as vinyl acetate, isopropenyl acetate and allyl acetate; aliphatic esters of ethylenically-unsaturated mono-or di-carboxylic acids such as methyl acrylate, methyl methacrylate, ethyl acrylate; monoethylenically-unsaturated ethers, e.g., vinyl isobutyl ether; nitriles of monoethylenically-unsaturated hydrocarbons such as acrylonitrile, and allyl cyanide; and dienes such as butadiene and isoprene.

The preferred ethylenically-unsaturated monomers are vinyl and vinylene group containing hydrocarbons, esters and ethers. Particularly preferred vinyl hydrocarbons are 1-alkenes of 1 to 8 carbon atoms and styrene while the preferred esters are the acrylate esters. The preferred ethers are vinyl ethers such as vinyl methyl ether, vinyl ethyl ether, vinyl propyl ether, vinyl isopropyl ether, vinyl n-butyl ether, vinyl isobutyl ether and the isopropenyl homologues.

If desired, the polymeric maleic anhydrides can be polymerization products of mixtures of two or more different maleic anhydrides with one or more of the other polymerizable unsaturated monomers, or alternatively two or more of the unsaturated monomers with one or more of the maleic anhydrides.

The polymeric maleic anhydride reactant of the invention can vary considerably as to monomer constitution. Useful polymers of maleic anhydride commonly have a maleic anhydride to total other comonomer in molar ratios of 1:1 to 1:4. Typical useful copolymers include copoly-(ethylene-maleic anhydride), copoly(styrene-maleic anhydride), copoly(tetramethylbutadiene-maleic anhydride) and the like.

Typical carbamate and carbazate compounds which are reacted with the maleic anhydride interpolymers to produce the intermediate product are represented by the structure:

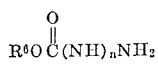

wherein $R^6$ is a hydrocarbon of 1 to 12 carbon atoms, preferably 1 to 3 carbon atoms and $n$ is an integer of 0 to 1. $R^6$ can be aliphatic (including cycloaliphatic), aromatic, and can be saturated or unsaturated but is preferable alkyl. Illustrative of suitable carbamates (i.e., when $n$ in the above formula is 0) and carbazates (i.e., when $n$ in the above formula is 1) are methyl, ethyl, n-propyl, isobutyl, isobutenyl, isoamyl, hexyl, hexenyl, heptyl, octyl, decyl, dodecyl, benzyl, phenyl, tolyl, xylyl, naphthyl carbamates or carbazates and the like.

Reaction of the polymers of maleic anhydride with the carbamates or carbazates is effected by heating the reactants at elevated temperatures to react the anhydride unit with the primary amine group of the carbamate or carbazate and form an imide ring. The reaction temperature will vary depending upon the particular reactants selected but ordinarily is at least about 100° C., usually about 110 to 200° C. The reaction may be conducted in an inert solvent for the reactants as, for instance, dioxane, dimethylformamide, dimethylsulfoxide, hexamethylphosphoramide, N-methylpyrrolidone, etc., or alternatively the interpolymer may be dissolved directly in the molten carbamate or carbazate and the mixture then heated up to reaction temperature. The reactants need not be on an equimolar basis but it is advisable to use sufficient carbamate or carbazate to ensure reaction of at least 75 or 80%, preferably all (100%) of the anhydride units in the interpolymer. The mole ratio of the carbamate or carbazate reactant to the interpolymer, therefore, should be at least about 0.75:1 based on the anhydride units.

Such interpolymers are then reacted with a compound containing at least one tertiary amine substituent and a primary amine substituent to form the unquaternized mordants of this invention. The amine-containing compounds which can be reacted with the interpolymers can be represented by the structures:

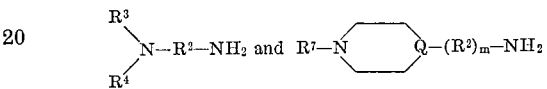

wherein $R^3$, $R^4$, $R^2$, $m$ and $Q$ are as defined above, and $R^7$ is a lower alkyl group of 1 to 6 carbon atoms.

The reaction of the amine and the interpolymer can be generally conducted by heating them in an inert solvent and/or under an inert atmosphere for a time sufficient to achieve the desired degree of reaction.

The heating can be conducted at temperatures approaching the degradation temperature of the reactants and desired products but ordinarily is effected in the range of about 100 to 200° C. Reaction times and conditions will vary, of course, depending upon the specific reactants employed. For certain reactants, inert reaction solvents can be used such as dioxane, toluene, dimethylformamide, xylene, etc.

In the reaction of the carbamate or carbazate derivative of the maleic anhydride interpolymer with the amine, the reactants need not be on an equimolar basis but sufficient diamine should be used to ensure liberation of enough $R^6O^-$ groups in the polymer as the corresponding alcohol to provide an interpolymer product which contains at least about 50% by weight and preferably at least 70%, by weight, of the structural unit:

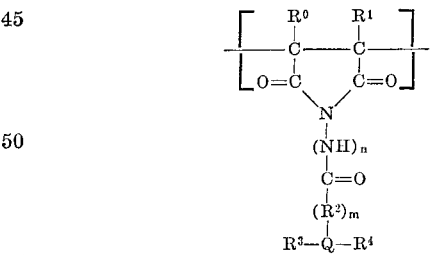

wherein $R^0$, $R^1$, $R^2$, $R^3$, $R^4$, $m$, $n$ and $Q$ have the values assigned above. The polymers of this invention having quaternized units retain dyes much better under basic conditions than the acid salts of the corresponding unquaternized compounds. Conveniently, the quaternization can be effected by using an alkylating agent which can be represented by the structure $R^7X$ wherein $R^7$ is an aliphatic radical of from 1 to 4 carbon atoms, such as methyl, ethyl, propyl, butyl, and the like; X is a negative, monovalent salt forming atom or radical such as monoalkyl sulfate, sulfonate, dialkyl phosphate, halide, etc. All of the units above can be quaternized or only a portion of them need be quaternized depending on the desired property of the mordant. The quaternization may be effected in a solvent such as water, dimethylformamide, dimethylsulfoxide, dimethylacetamide, or an alcohol such as methanol, ethanol, isopropanol, Cellosolve and the like. Generally, the quaternization is carried out to quaternize at least 50 percent of the tertiary nitrogen atoms attached to the said maleimide units. Temperatures from room temperature to 125° C. or more are generally used and if quaternization of only a part of the tertiary nitrogen atoms is desired, the amount of quaternizing agent may be reduced to correspond with the number of tertiary nitrogen atoms to be converted.

The substituted maleimide polymers of the invention can also be used in photographic compositions in aqueous acid solutions whereby at least a portion of the units in the substituted maleimide polymer are in the form of acid salts. For example, they can be used as mordants in the manner disclosed in Minsk et al. U.S. Pat. 3,048,-487, issued Aug. 7, 1962; Minsk et al. U.S. Pat. 3,148,-309, issued May 18, 1965, and the like. When the novel polymers are converted to the acid salts at least a portion of the polymer units are in the following form:

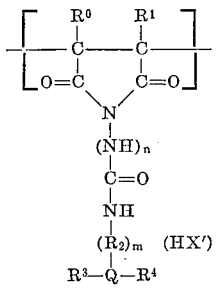

wherein $R^0$, $R^1$, $R^2$, $R^3$, $R^4$, $m$, $n$ and $Q$ each have the values given above, $X'$ represents an acid radical (inorganic or organic), such as lactyloxy, glycolyloxy, acetoxy, propionoxy, alkanesulfonoxy, (e.g., methanesulfonoxy, ethanesulfonoxy, n-butanesulfonoxy, etc., especially such radicals containing from 1 to 4 carbon atoms), chloride, and the like.

Mordanting amounts of the novel polymers of the invention may be incorporated in water-permeable hydrophilic organic colloids or other polymeric binder materials and the resulting mixture used in the preparation of dye imbibition printing blanks and receiving layers for color transfer processes, such as those described in Rogers U.S. Pat. 2,983,606 and Whitmore U.S. Pat. 3,227,552 and U.S. Pat. 3,227,550. Satisfactory colloids which can be used for this purpose include any of the hydrophilic colloids generally employed in the photographic field, including, for example, gelatin, colloidal albumin, polysaccharides, cellulose derivatives, synthetic resins such as polyvinyl compounds, including poly(vinyl alcohol) derivatives, acrylamide polymers and the like. In addition to the hydrophilic colloids, the vehicle or binding agent can contain colloids such as dispersed polymerized vinyl compounds, particularly those which increase the dimensional stability of photographic materials. Suitable compounds of this type include water-insoluble polymers and copolymers of alkyl acrylates or methacrylates.

The quantity of mordant employed in the water-permeable colloid can be varied, depending upon the particular mordant and its chemical characteristics, as well as the dyes to be fixed in the mordanting layer. In general, the quantity of mordant should be at least 10 percent by weight, based on the weight of hydrophilic colloid. Larger amounts of mordant can be employed in the hydrophilic colloid layers and amounts as high as 50 percent by weight, based on the weight of the hydrophilic colloid, give quite useful results.

The mordants can also be used for fixing the dyes, and particularly acid dyes, used in the preparation of photographic filter, antihalation or gelatin-silver halide emulsion layers. Such layers can be coated in conventional photographic supports, such as flexible sheet supports (e.g., cellulose acetate, polyester films, polyvinyl resins, etc.) or paper, glass, etc.

The invention can be further illustrated by the following examples of preferred embodiments thereof, although it will be understood that these examples are included merely for the purposes of illustration unless otherwise specifically indicated.

EXAMPLE 1

To 44.5 g. (0.5 mole) of molten ethyl carbamate at 80° C. is added, portionwise with stirring, 10.5 g. (0.083 mole) of copoly[ethylene-maleic anhydride] over a half-hour period. Then 44.5 g. more ethyl carbamate and finally 10.5 g. more polymer are added. The temperature is increased to 140° C. where a slight effervescence appears. When the temperature reaches 150°, gas evolution became rapid and the temperature increases to 161°. At this point a Dean-Stark trap is inserted and 1.2 ml. of water is collected. After addition of 100 ml. dimethylformamide and continued heating, 50 ml. of dimethylformamide is distilled off at 150–154°. The mixture is cooled, precipitated in ether, washed, and vacuum dried. Yield, 18.5 g.

*Analysis.*—Calcd. (percent): C, 54.7; H, 5.6; N, 7.1. Found (percent): C, 57.6; H, 6.3; N, 6.0.

A mixture of 10 g. of the above copolymer and 100 ml. of dimethylaminopropylamine is heated at 125° under $N_2$ in an oil bath until solution is complete. Heating is continued at 25 ml. of solvent is distilled off. The mixture is cooled, precipitated in ether, washed, and vacuum dried. Yield, 12.7 g.

*Analysis.*—Found (percent): C, 61.5; H, 8.9; N, 13.8.

This intermediate is quaternized in 100 ml. dimethylformamide with 27.9 g. methyl p-toluenesulfonate. Yield, 21.7 g.

*Analysis.*—Found (percent): C, 55.4; H, 7.2; N, 6.8; S, 8.2.

EXAMPLE II

To a solution of 12.6 g. (0.1 mole) of copoly[ethylene: maleic anhydride] in 150 ml. of dimethylformamide is added 15 g. (0.15 mole) of ethyl carbazate. The solution turns green for a short time, then colorless again, and then the solution gels. It is heated in a 165° bath and 15 ml. of solvent is distilled off. The solution is now fluid again and dark red. It is precipitated in ether, washed, and vacuum dried. Yield, 18 g.

*Analysis.*—Calcd. (percent): C, 51.2; H, 5.7; N, 13.2; ethoxyl, 21.2. Found (percent): C, 50.1; H, 6.1; N, 14.9; ethoxyl, 16.5.

A solution of 13 g. of the above derived polymer is heated with dimethylaminopropylamine at 100° overnight. The mixture is cooled, precipitated in ether, washed, and vacuum dried. Yield, 11 g.

*Analysis.*—Calcd. (percent): C, 51.2; H, 5.7; N, 13.2;

This polymer is quaternized with 18 g. of methyl-p-toluenesulfonate in 100 ml. dimethylformamide. Yield, 14 g.

*Analysis.*—Found (percent): C, 56.0; H, 7.5; N, 6.3; S, 7.8.

EXAMPLE III 10 grams of copoly[tetramethylbutadiene-maleic anhydride] is substituted for copoly[ethylene-maleic anhydride] in Example II above and the example is repeated. Yield, 10 g.

*Analysis.*—Found (percent): C, 60.1; H, 7.9; N, 6.1; S, 6.2.

EXAMPLE IV 10 grams of copoly[styrene-maleic anhydride] is substituted for copoly[ethylene-maleic anhydride] in Example II above and the example is repeated. Yield, 11 g.

*Analysis.*—Found (percent): C, 62.6; H, 6.9; N, 6.0, 5.8; S, 6.9.

The following example illustrates the preparation of imbibition printing blanks using the novel mordants of the invention.

EXAMPLE V 454 grams of gelatin are soaked in 536 cc. of distilled water until well swollen, and the mixture heated to 40° C. to dissolve the gelatin. Some saponin solution is then added as a coating aid, and 65 cc. of 50% aqueous glycerin in 1000 grams of a 10% solution of the resinous mordant produced according to Example I above in dilute acetic acid. The pH of the mixture is adjusted to approximately 4.2 and 27 cc. of 10% aqueous formaldehyde solution added. The resulting solution is coated onto a cellulose acetate film support at the rate of approximately 1.25 grams of gelatin (dry weight) per square foot. The element provides a good receiving sheet for acid dyes.

EXAMPLE VI

This example shows the use of the imide polymers of our invention as overcoating layers over light-sensitive gelatino-silver-halide emulsion layers.

One pound of dry gelatin is soaked in water and dissolved at approximately 40° C. To this is added a solution containing 150 g. of the resinous mordant prepared according to Example I, 65 cc. of 50% glycerine and some saponin solution. The mixture is diluted with water to a satisfactory concentration for coating, the pH is adjusted to 4.2–4.3, and 27 cc. of 10% formaldehyde solution is added. This solution is then coated over the light-sensitive gelatino-silver-halide emulsion layer at the rate of 1 lb. dry gelatin per 1300 square feet. The element thus obtained on exposing to an image, developing and fixing functions as a mordanted dye transfer blank containing the silver image as a density.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. An interpolymer comprising (1) units represented by the formula:

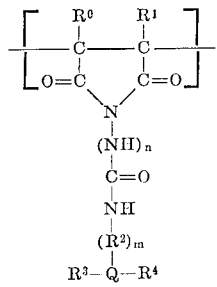

wherein $R^0$ and $R^1$ each represent hydrogen or alkyl; $R^2$ represents an alkylene group; $R^3$ and $R^4$ are each a lower alkyl group or $R^3$ and $R^4$ can together with Q represent the atoms of a tertiary nitrogen-containing heterocyclic group; $n$ is 0 or 1, $m$ is 0 or 1, and Q represents a nitrogen atom or a carbon radical, with the proviso that $R^3$ and $R^4$ are taken together with Q to represent a tertiary nitrogen-containing heterocyclic group when Q is a carbon radical, and $m$ can be 0 only when Q is a carbon radical, aid units of said formula being in copolymerized relationship with (2) units of at least one other ethylenically unsaturated monomer in a molar ratio of formula units to total other monomer units of from between about 1:1 to about 0.75:4.25.

2. The interpolymer of claim 1 wherein a unit of ethylenically unsaturated monomer is styrene.

3. An interpolymer according to claim 1 containing at least one quaternized nitrogen atom.

4. A photographic element comprising a polymer according to claim 3.

5. A photographic element comprising a polymer according to claim 1.

6. A dye imbibition printing blank comprising a polymer according to claim 1

7. A polymer according to claim 1 comprising at least about 50% by weight of said (1) units.

8. A process comprising reacting a compound represented by the formula:

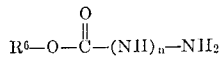

wherein $R^6$ is a hydrocarbon of 1 to 12 carbon atoms and $n$ is an integer of 0 to 1 with an interpolymer comprising the copolymerized product of an ethylenically unsaturated monomer with units of maleic anhydried in a molar ratio maleic anhydride to ethylenically unsaturated monomer of from between about 1:1 to about 1:4.

9. A process according to claim 8 wherein the reaction temperature is at least about 100° C.

10. A process according to claim 8 further comprising reaction of the interpolymer with a compound containing at least one tertiary amine and a primary amine.

11. A process according to claim 10 wherein said reaction is carried out in an inert solvent or under an inert atmosphere.

12. A process according to claim 10 further comprising quarternization with an alkylating agent represented by the structure $R^7X$ wherein $R^7$ is an alkyl radical and X is a monovalent salt forming atom or radical.

13. An interpolymer comprising (1) units represented by the formula:

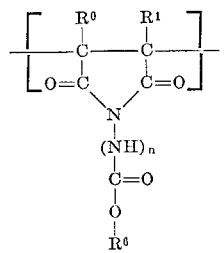

wherein $R^0$ and $R^1$ represent hydrogen atoms or alkyl groups, $n$ is an integer of 1 or 2 and $R^6$ is a hydrocarbon, said units being in copolymerized relationship with (2) units of at least one other ethylenically unsaturated monomer in a molar ratio of formula units to total other monomer units of from between about 1:1 to about 0.75:4.25.

14. A polymer according to claim 13 wherein said units are in copolymerized relationship with (1) units of ethylene.

References Cited

UNITED STATES PATENTS 3,398,092 8/1968 Fields et al. _____ 260—78.5X

FOREIGN PATENTS 1,449,288 10/1965 France.

JOSEPH L. SCHOFER, Primary Examiner

J. KNIGHT III, Assistant Examiner

U.S. Cl. X.R.

260—77.5; 96—57, 84

UNITED STATES PATENT OFFICE
CERTIFICATE OF CORRECTION

Patent No. 3,557,066          Dated January 19, 1971

Inventor(s) Hyman L. Cohen and James R. King, Jr.

It is certified that error appears in the above-identified patent and that said Letters Patent are hereby corrected as shown below:

Column 1, lines 15-26, the formula should be

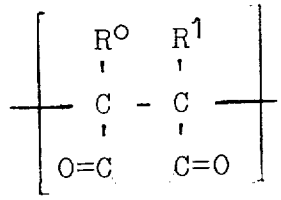
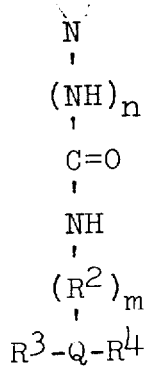

Column, 6, line 47 should read

<u>Analysis</u>,-Found:. (percent): C, 53.9; H, 7.5; N, 20.8.

Column 7, line 58, "aid" should read ---said---.

Signed and sealed this 20th day of July 1971.

(SEAL)
Attest:

EDWARD M. FLETCHER, JR.
Attesting Officer

WILLIAM E. SCHUYLER,
Commissioner of Pate

UNITED STATES PATENT OFFICE
CERTIFICATE OF CORRECTION

Patent No. 3,557,066      Dated January 19, 1971

Inventor(s) Hyman L. Cohen and James R. King, Jr.

It is certified that error appears in the above-identified patent and that said Letters Patent are hereby corrected as shown below:

Column 8, line 46, "1 or 2" should read ---0 or 1---.

Signed and sealed this 19th day of November 1974.

(SEAL)
Attest:

McCOY M. GIBSON JR.
Attesting Officer

C. MARSHALL DANN
Commissioner of Patents